United States Patent
Zhou et al.

(10) Patent No.: US 11,839,934 B1
(45) Date of Patent: Dec. 12, 2023

(54) METHOD FOR PREPARING SUPER-HYDROPHOBIC ALUMINUM ALLOY SURFACE THROUGH FLAT-TOPPED LASER PEENING

(71) Applicant: JIANGSU UNIVERSITY, Zhenjiang (CN)

(72) Inventors: Jianzhong Zhou, Zhenjiang (CN); Yanqiang Gou, Zhenjiang (CN); Li Li, Zhenjiang (CN); Hongxu Pu, Zhenjiang (CN); Songling Chen, Zhenjiang (CN); Xiankai Meng, Zhenjiang (CN); Shu Huang, Zhenjiang (CN)

(73) Assignee: JIANGSU UNIVERSITY, Zhenjiang (CN)

(*) Notice: Subject to any disclaimer, the term of this patent is extended or adjusted under 35 U.S.C. 154(b) by 0 days.

(21) Appl. No.: 18/010,839

(22) PCT Filed: Jul. 18, 2022

(86) PCT No.: PCT/CN2022/106171
§ 371 (c)(1),
(2) Date: Dec. 16, 2022

(30) Foreign Application Priority Data

Jun. 8, 2022 (CN) .............................. 202210641002

(51) Int. Cl.
*B23K 26/30* (2014.01)
*B23K 26/352* (2014.01)
(52) U.S. Cl.
CPC .................................. *B23K 26/355* (2018.08)
(58) Field of Classification Search
None
See application file for complete search history.

(56) References Cited

U.S. PATENT DOCUMENTS

2019/0373735 A1* 12/2019 Ren .................. H05K 3/0032

FOREIGN PATENT DOCUMENTS

CN 102191497 A * 9/2011
CN 104947116 A 9/2015
(Continued)

OTHER PUBLICATIONS

Machine translation of CN 110340536A, Jul. 2023 (Year: 2023).*
Machine translation of CN 102191497A, Jul. 2023 (Year: 2023).*
Machine translation of WO 2016008198 A1, Jul. 2023.*

*Primary Examiner* — Geoffrey S Evans
(74) *Attorney, Agent, or Firm* — Bayramoglu Law Offices LLC

(57) ABSTRACT

A method for preparing a super-hydrophobic aluminum alloy surface through flat-topped laser peening includes the following steps: pretreating an aluminum alloy surface; evenly coating the pretreated aluminum alloy surface with a nanoscale carbon powder layer; performing unconstrained peening treatment on the aluminum alloy surface using a square spot flat-topped nanosecond pulsed laser with the nanoscale carbon powder layer serving as an absorption layer, where beams are kept perpendicular to the aluminum alloy surface all the time; and removing residual carbon nanopowder after the peening, and reducing surface energy of the aluminum alloy material through low-temperature heat treatment, to obtain a super-hydrophobic aluminum alloy surface with micro-nano multiscale structures. According to the present disclosure, the carbon content near the surface layer of the aluminum alloy material is increased, and the hardness and wear resistance of the prepared hydrophobic surface can be effectively improved.

6 Claims, 3 Drawing Sheets

(56) References Cited

FOREIGN PATENT DOCUMENTS

| | | | | |
|---|---|---|---|---|
| CN | 105039652 | A | | 11/2015 |
| CN | 106112268 | A | | 11/2016 |
| CN | 106119467 | A | | 11/2016 |
| CN | 109880998 | A | | 6/2019 |
| CN | 110340536 | A | * | 10/2019 |
| CN | 111468831 | A | | 7/2020 |
| CN | 112375899 | A | | 2/2021 |
| CN | 113967796 | A | | 1/2022 |
| CN | 114406475 | A | | 4/2022 |
| JP | 2007169753 | A | | 7/2007 |
| WO | WO-2016008198 | A1 | * | 1/2016 ......... B23K 26/0732 |

* cited by examiner

METHOD FOR PREPARING SUPER-HYDROPHOBIC ALUMINUM ALLOY SURFACE THROUGH FLAT-TOPPED LASER PEENING

CROSS REFERENCE TO THE RELATED APPLICATIONS

This application is the national phase entry of International Application No. PCT/CN2022/106171 filed on Jul. 18, 2022, which is based upon and claims priority to Chinese Patent Application No. 202210641002.3 filed on Jun. 8, 2022.

TECHNICAL FIELD

The present disclosure relates to the field of preparation of super-hydrophobic aluminum alloy surfaces, and specifically to a method for preparing a super-hydrophobic aluminum alloy surface through flat-topped laser peening.

BACKGROUND

Aircraft-grade aluminum alloys are light in weight, high in strength, and good in toughness, have excellent mechanical properties and machining performance, and are widely used in aviation and aerospace fields. Because the surface of aircraft-grade aluminum alloy has high wettability, water droplets are likely to adhere and condense on the surface in a low-temperature humid environment. The surface of the material is prone to corrosion and freezing, adversely affecting the service life and usage performance of aluminum alloy components. A large number of studies have shown that the formation of super-hydrophobic structures on the surface of the aircraft-grade aluminum alloy can effectively slow down the corrosion and freezing of the material surface. Therefore, the preparation of super-hydrophobic aluminum alloy surfaces is of great significance in the aviation and aerospace fields.

At present, there are various methods for preparing a super-hydrophobic surface from an aluminum alloy material, such as an electrochemical method, an electrical discharge machining method, a chemical etching method, an electroplating method, a sol-gel method, etc. However, these preparation methods have many drawbacks such as complex process and low efficiency. Some of these methods require special equipment and a demanding preparation environment, resulting in high costs of preparing a super-hydrophobic surface. The prepared hydrophobic structure has problems such as low strength and poor mechanical stability, and reduced strength of the matrix material after the preparation, greatly limiting the application of the super-hydrophobic surface preparation technologies to aircraft-grade aluminum alloy components for use in complex and harsh environments.

As a novel surface modification and strengthening process, a laser peening technology uses a plasma shock wave generated by laser irradiation on the surface of a material to cause beneficial changes in the microstructure of the material near the surface, and at the same time induce high-amplitude residual compressive stress inside the matrix, to effectively improve the mechanical properties of the material. It has the advantages of high strengthening efficiency and strong controllability. The thermal-mechanical coupling effect produced by laser peening can be utilized to form porous micro-nano multiscale structures on the surface of aircraft-grade aluminum alloy, and impart the aluminum alloy surface with super-hydrophobicity after reducing the surface energy. This is an important super-hydrophobic surface preparation method. However, in conventional processes for preparing a super-hydrophobic aluminum alloy surface through laser peening, a circular Gaussian spot without an absorption layer is used for peening. Affected by the circular Gaussian spot and the overlap rate during peening, the prepared super-hydrophobic macroscopic surface is not even, which increases the rolling resistance of droplets, making it more difficult for the droplets to slide off the surface of the material. In addition, such processes have limited ability to improve the strength of the prepared hydrophobic structures.

SUMMARY

To overcome the drawbacks in the prior art, the present disclosure provides a method for preparing a super-hydrophobic aluminum alloy surface through flat-topped laser peening. On the basis of conventional processes for preparing a super-hydrophobic surface through laser peening, unconstrained peening is performed using a square spot flat-topped laser with a carbon powder layer serving as an absorption layer. On the one hand, laser irradiation increases the absorption rate of laser energy on the carbon powder layer. Part of the carbon powder converts into plasma after absorbing the laser energy. A shock wave generated by the rapid expansion of the plasma stirs and mixes the melted carbon powder and a remelted material on the aluminum alloy surface layer, to increase the carbon content near the surface layer of the aluminum alloy material, thereby improving hardness and wear resistance of the prepared hydrophobic surface. On the other hand, the thermal-mechanical coupling effect produced by laser peening forms porous micro-nano multiscale structures (3) having a hydrophobic effect on the aluminum alloy surface, and at the same time effectively strengthens the microstructure of the matrix material and improves the mechanical properties. The use of the square spot flat-topped pulsed laser as the light source of laser peening can effectively change the uneven morphology produced by peening using a circular spot Gaussian laser and improve the surface evenness, thereby effectively reducing the sliding resistance of droplets, and further improving the super-hydrophobic effect of the prepared surface. Therefore, in the present disclosure, by unconstrained peening using the square spot flat-topped pulsed laser with the carbon powder layer serving as the absorption layer, the preparation of the super-hydrophobic surface on the aluminum alloy material matrix is efficiently completed, and the matrix material is also strengthened. In this way, the super-hydrophobic effect and the surface strength are also effectively improved, and the mechanical wear resistance of the super-hydrophobic surface is enhanced.

The above technical object of the present disclosure is attained with the following technical means.

A method for preparing a super-hydrophobic aluminum alloy surface through flat-topped laser peening is provided, including the following steps:
  pretreating an aluminum alloy surface;
  evenly coating the pretreated aluminum alloy surface with a nanoscale carbon powder layer;
  performing unconstrained peening treatment on the aluminum alloy surface using a square spot flat-topped nanosecond pulsed laser with the nanoscale carbon powder layer serving as an absorption layer, where beams are kept perpendicular to the aluminum alloy surface all the time; laser irradiation on the nanoscale carbon powder layer increases an absorption rate of laser energy; part of carbon powder converts into plasmas after absorbing the laser energy; and a shock wave generated by rapid expansion of the plasmas stirs and mixes melted carbon powder and a remelted material of the aluminum alloy surface, to increase a carbon content near the aluminum alloy surface; and removing residual carbon nanopowder after the peening, and reducing surface energy of the material through low-temperature heat treatment, to obtain a super-hydrophobic aluminum alloy surface with micro-nano multiscale structures.

Further, the pretreating includes: grinding and polishing the aluminum alloy surface step by step to reach a surface roughness of less than or equal to 50 µm, ultrasonically cleaning the treated surface with deionized water, and drying.

Further, the nanoscale carbon powder layer is a uniform mixture of 97% of carbon nanopowder and 3% of an epoxy resin adhesive and is dried and solidified on the pretreated aluminum alloy surface, a diameter range of the carbon nanopowder is 50 nm-300 nm, and a thickness of the nanoscale carbon powder layer is 100 µm-500 µm.

Further, the square spot flat-topped nanosecond pulsed laser is obtained by passing a circular flat-topped nanosecond pulsed laser through a beam shaper, and is used to homogenize hydrophobic micro-nano structures and hardness of the aluminum alloy surface.

Further, a laser emitter that generates the square spot flat-topped nanosecond pulsed laser is an Nd:YAG solid-state laser emitter, and processing parameters of the laser emitter include: a wavelength of 1064 nm, laser energy of 1 J-15 J, a repetition frequency of 1 Hz-5 Hz, a pulse width of 10 ns-20 ns, and a square spot side length of less than or equal to 5 mm.

Further, a method for reducing the surface energy of the material through the low-temperature heat treatment is: treating the peened aluminum alloy material in a vacuum drying oven at 80° C.-150° C. for 1 h-10 h.

The beneficial effects of the present disclosure are as follows.

1. The method for preparing the super-hydrophobic aluminum alloy surface through flat-topped laser peening according to the present disclosure adopts the square spot flat-topped pulsed laser. As compared with conventional peening processes adopting a circular spot Gaussian pulsed laser, stress waves are mainly compressional plane waves that travel longitudinally, and energy of surface transverse waves accounts for a small proportion. Based on this characteristic, there is no complex interference between residual stress fields induced by adjacent peening points during the peening using the square spot flat-topped laser, and the inhomogeneity of the stress-strain field caused by the peening sequence is greatly weakened, thereby avoiding stress-induced voiding caused during peening using the circular spot Gaussian pulsed laser. The macroscopic surface morphology after peening is relatively even, which is conducive to improving the hydrophobic effect of the prepared surface and makes the distribution of the residual compressive stress field of the matrix material more uniform, thereby prolonging the service life of the material.

2. In the method for preparing the super-hydrophobic aluminum alloy surface through flat-topped laser peening according to the present disclosure, the carbon powder layer is used as the absorption layer during laser peening. When the intense pulsed laser with high power density is irradiated on the surface of the aluminum alloy sheet, the carbon powder is quickly ionized and gasified after absorbing part of the energy, and the remained carbon powder continues to absorb laser energy to generate a high-pressure shock wave to stir and mix the melted carbon powder and the remelted material of the aluminum alloy surface, to increase the carbon content near the aluminum alloy surface, thereby effectively improving the hardness of hydrophobic micro-nano structures and imparting the prepared super-hydrophobic surface with good wear resistance. In addition, under the mechanical effect of laser peening, a high dislocation density is formed on the surface of the metal material, grains are also effectively refined, and the wear resistance and mechanical stability of the structure surface are improved.

3. In the method for preparing the super-hydrophobic aluminum alloy surface through flat-topped laser peening according to the present disclosure, the low-temperature heat treatment process is used to reduce the surface energy of the surface with micro-nano multiscale structures, which is clean and pollution-free. The low-temperature heat treatment allows the surface of the sample to fully interact with oxygen in air, so as to control the composition of the surface with micro-nano multiscale structures to significantly improve the absorption capacity of the aluminum alloy surface to organic matters in the air. The introduction of a large amount of carbon elements in the micro-nano multiscale structures during the laser peening process increases the number of non-polar functional groups on the surface of the material, so that the surface energy is effectively reduced, thereby realizing the preparation of a super-hydrophobic aluminum alloy surface without fluorine addition.

4. The method for preparing the super-hydrophobic aluminum alloy surface through flat-topped laser peening according to the present disclosure has the advantages of simple operation, low costs, etc., is suitable for large-scale industrial production, and significantly improves the wear resistance and mechanical stability of the micro-nano multiscale structures on the super-hydrophobic surface. Accordingly, the strength of the aluminum alloy matrix material is also improved to a certain extent, so that the aluminum alloy can better adapt to the complex and demanding environment in the aviation and aerospace fields and can be used in a wider range of industrial applications.

BRIEF DESCRIPTION OF THE DRAWINGS

In order to more clearly explain the technical solutions in the embodiments of the present disclosure or in the prior art, the drawings used in the description of the embodiments or the prior art will be briefly described below. Obviously, the drawings depicted below are merely embodiments of the present disclosure, and those skilled in the art can obtain other drawings based on these drawings without any creative efforts.

DETAILED DESCRIPTION OF THE EMBODIMENTS

Figure 1:
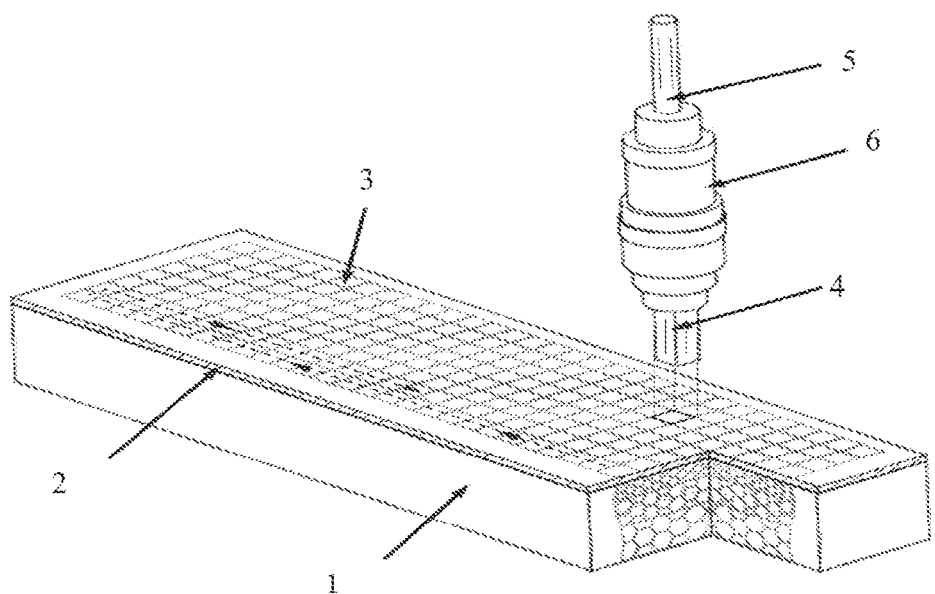
FIG. 1 is a diagram showing the principle of a method for preparing a super-hydrophobic aluminum alloy surface through flat-topped laser peening according to the present disclosure.

The present disclosure will be further described in detail below with reference to drawings and embodiments, but the protection scope of the present disclosure is not limited thereto.

Embodiments of the present disclosure will be exemplarily described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

As shown in FIG. 1, a method for preparing a super-hydrophobic aluminum alloy surface through flat-topped laser peening according to the present disclosure includes the following steps.

An aluminum alloy surface of an aircraft-grade aluminum alloy (1) is ground and polished step by step to reach a surface roughness of less than or equal to 50 μm, and the treated surface is ultrasonically cleaned with deionized water, and dried.

A nanoscale carbon powder layer (2) with a diameter ranging from 50 nm-300 nm is coated on the aluminum alloy surface, to form a nanoscale carbon powder layer (2) with a thickness of 100 μm-500 μm on the aluminum alloy surface. Where the nanoscale carbon powder layer (2) is a uniform mixture of 97% of carbon nanopowder and 3% of an epoxy resin adhesive and is dried and solidified on the pretreated aluminum alloy surface. Due to the low vaporization temperature of the epoxy resin adhesive, the epoxy resin adhesive completely volatilizes under laser irradiation, and this does not change the composition of a remelted layer, and only plays a role of adhering carbon nanopowder.

Unconstrained peening treatment is performed on the aluminum alloy surface using a square spot flat-topped nanosecond pulsed laser emitter (4) having a reasonable parameter and path configuration, with the nanoscale carbon powder layer (2) serving as an absorption layer, where beams are kept perpendicular to the aluminum alloy surface all the time, to homogenize hydrophobic micro-nano structures (3) and hardness of the aluminum alloy surface.

After the peening, residual carbon nanopowder is removed from the aluminum alloy surface by ultrasonic cleaning. Then the peened plate is subjected to low-temperature heat treatment in a vacuum drying oven with a constant temperature of 80° C.-150° C. for 1 h-10 h to reduce surface energy of the material, thus completing the preparation of a super-hydrophobic aluminum alloy surface with micro-nano multiscale structures (3).

In the method for preparing the super-hydrophobic aluminum alloy surface through flat-topped laser peening according to the present disclosure, a circular spot flat-topped nanosecond pulsed laser (5) is converted into a square spot flat-topped nanosecond pulsed laser (4) through a beam shaper (6). Unconstrained laser peening is performed on the aluminum alloy surface using the square spot flat-topped nanosecond pulsed laser (4) with the nanoscale carbon powder layer (2) serving as the absorption layer. Then, the low-temperature heat treatment process is performed to reduce the surface energy of the material, to impart the aluminum alloy surface with super-hydrophobicity. The use of the square spot flat-topped pulsed laser for peening facilitates the control of residual compressive stress generated by laser peening to make the stress distribution more uniform, thereby effectively prolonging the service life of the material. With the use of the nanoscale carbon powder layer (2) as the absorption layer during laser peening, the absorption rate of laser energy is increased, and a high-intensity plasma shock wave is generated, which strengthens the material by impacting and stirs and mixes the melted carbon powder and a remelted material of the aluminum alloy surface, to greatly increase the carbon content near the aluminum alloy surface, thereby improving the strength and hardness of the prepared multiscale micro-nano structures (3), and providing the prepared super-hydrophobic surface with high matrix wear resistance and high mechanical stability. By optimizing the configuration of parameters such as laser spot size and shape, laser energy, overlap rate and peening path, the macroscopic morphology of the super-hydrophobic surface prepared by laser peening can be controlled to make the prepared surface relatively even, thereby effectively reducing the sliding resistance and the rolling angles of droplets. In the present disclosure, a large number of non-polar functional groups are introduced to the aluminum alloy surface through the low-temperature heat treatment process, to reduce the surface energy of the prepared micro-nano multiscale structures. In this way, a super-hydrophobic aluminum alloy surface is prepared without fluorine addition.

To make the objectives, technical solutions, and advantages of the present disclosure clearer, the present disclosure is described in further detail below with reference to specific examples by using 2024-T351 aircraft-grade aluminum alloy as the subject of research.

Example 1

A method for preparing a super-hydrophobic aluminum alloy surface through flat-topped laser peening according to Example 1 included the following steps.

(1) A surface of the 2024-T351 aircraft-grade aluminum alloy was ground with 400-grit, 800-grit, 1000-grit, 1500-grit, and 2000-grit sandpapers, and polished on a grinding and polishing machine to a mirror surface (Ra: ≤50 μm). Then the surface of the sample was ultrasonically cleaned in absolute ethanol for 5 min, and dried in a vacuum drying oven for later use.

(2) Carbon powder with a diameter of 50 nm and an epoxy resin adhesive were mixed and coated on the surface of the aluminum alloy plate, to form a nanoscale carbon powder layer with a thickness of 100 μm on the aluminum alloy surface.

(3) An Nd:YAG high-repetition frequency and high-energy nanosecond pulsed laser emitter was used. A beam shaper was adjusted to convert a circular spot flat-topped pulsed nanosecond laser into a square spot flat-topped pulsed nanosecond laser. Specific parameters for laser peening include: a wavelength of 1064 nm, a laser frequency of 1 Hz, a pulse width of 20 ns, a spot overlap rate of 0%, a spot diameter of 3 mm, and laser energy of 5 J.

(4) After the laser peening, residual carbon powder was removed from the aluminum alloy surface by ultrasonic cleaning. The aircraft-grade aluminum alloy sample was subjected to low-temperature heat treatment in a drying oven with a temperature of 100° C. for 5 h to introduce a large number of non-polar functional groups on the surface of the aluminum alloy material, to reduce the surface energy of the aluminum alloy material. Thus, the preparation of a super-hydrophobic aluminum alloy surface was completed.

Figure 2A:
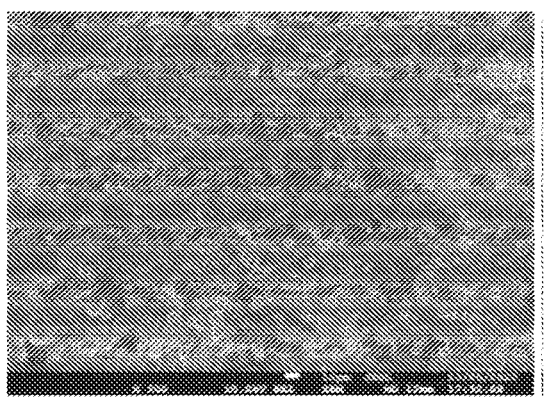
FIGS. 2A-2B are diagrams showing the actual effect of a morphology of a super-hydrophobic surface prepared in Example 1 of the present disclosure.
Figure 2B:
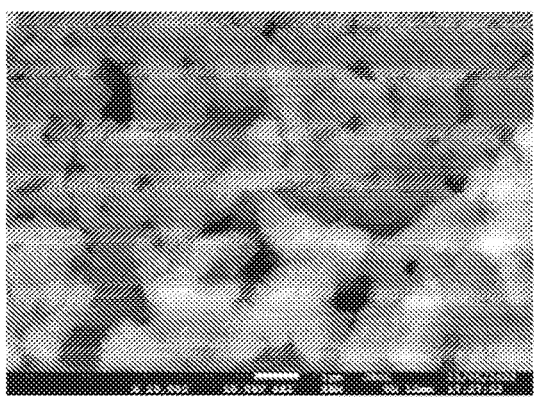
Figure 3A:
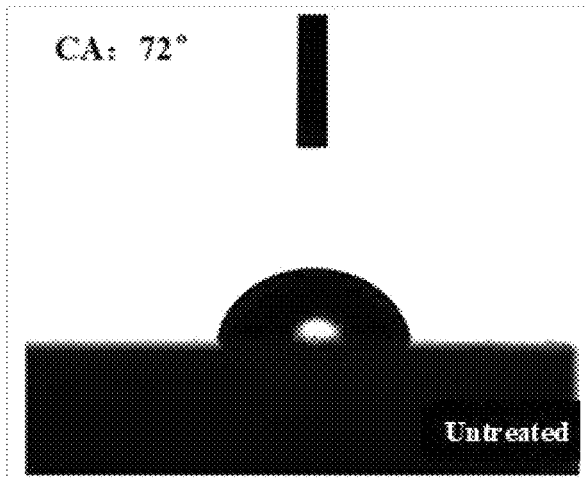
FIGS. 3A-3D are diagrams showing comparison of contact angles of droplets on super-hydrophobic surfaces prepared in various embodiments of the present disclosure.
Figure 3B:
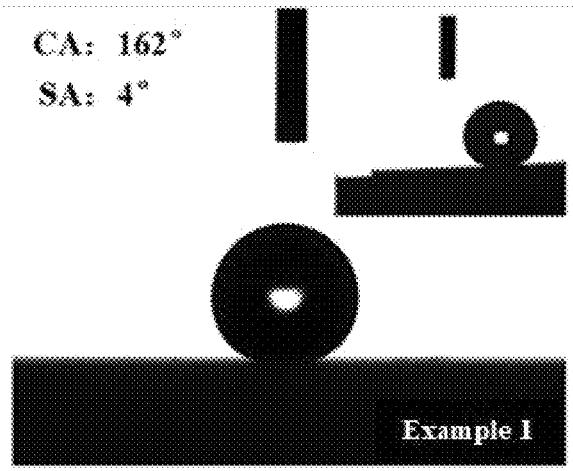
Figure 3C:
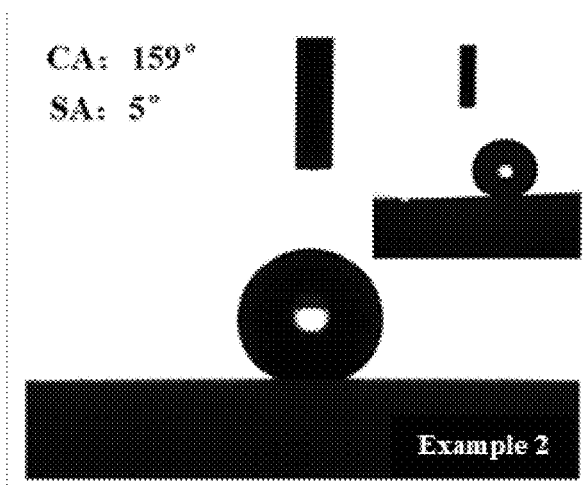
Figure 3D:
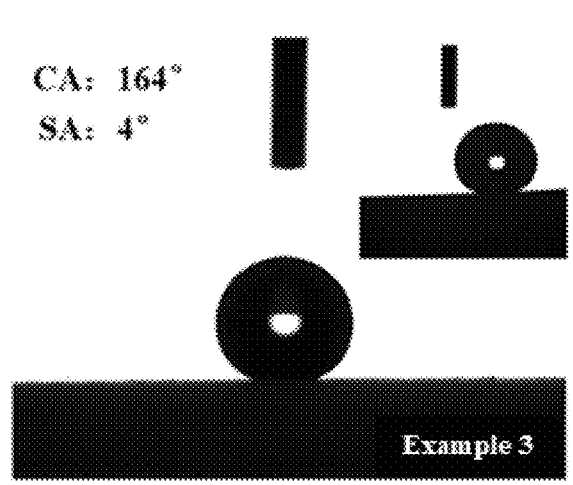
Figure 4:
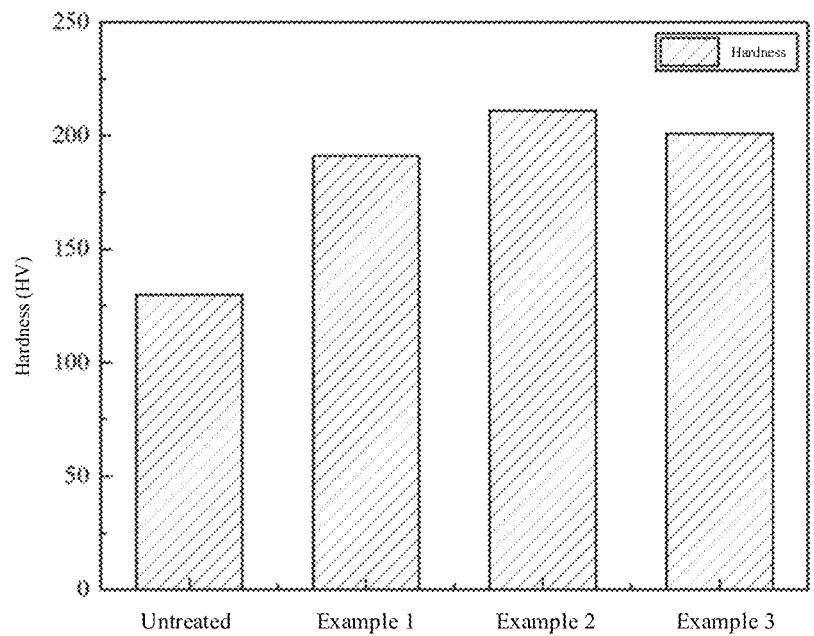
FIG. 4 is a diagram showing comparison of microhardness of super-hydrophobic surfaces prepared in various embodiments of the present disclosure.

The morphology of the super-hydrophobic aircraft-grade aluminum alloy surface prepared in Example 1 is shown in FIGS. 2A-2B. Compared with a super-hydrophobic aluminum alloy surface prepared using a circular spot Gaussian pulsed nanosecond laser, the macroscopic surface of the sample is more even, and has excellent morphology of micro-nano multiscale structures, which improves the hydrophobic effect of the prepared surface. As shown in FIGS. 3A-3D, the surface of the sample prepared in Example 1 has excellent super-hydrophobicity, with small sliding resistance of droplets, a droplet contact angle of 162°, and a droplet rolling angle of 4°. As shown in FIG. 4, due to the thermal-mechanical coupling effect generated by laser peening, the carbon content near the surface layer of the aircraft-grade aluminum alloy is increased greatly, and the microhardness of the prepared super-hydrophobic aircraft-grade aluminum alloy surface is greatly improved and reaches 191 HV, showing a 46.9% increase over an average hardness value of 130 HV of an untreated sample surface. This is of great significance for improving the wear resistance of the super-hydrophobic surface.

Example 2

On the basis of Example 1, in Example 2, the diameter of the carbon powder reached 300 nm, the thickness of the carbon powder absorption layer was 500 μm, and the energy of laser peening was set to 13 J.

As shown in FIGS. 3A-3D, the droplet contact angle and rolling angle of the super-hydrophobic surface obtained in Example 2 were respectively 159° and 5°, indicating that excellent super-hydrophobicity of the aircraft-grade aluminum alloy surface was also achieved. In Example 2, larger carbon powder particles and a thicker carbon powder absorption layer were used, and the energy of laser peening was also increased, which led to the formation of a deeper impact layer on the aircraft-grade aluminum alloy surface and an effectively improved strengthening effect. As shown in FIG. 4, the microhardness value of the super-hydrophobic aircraft-grade aluminum alloy surface prepared in this example was 211 HV, showing a 62.3% increase over an average hardness of 130 HV of the surface of an untreated sample matrix material, and a 10.5% increase over the average hardness of 191 HV of the sample surface treated in Example 1. More carbon powder and higher laser energy allow for a more thorough mixing of the carbon element and the remelted material of the aluminum alloy surface, thereby further improving the hardness and mechanical stability of the super-hydrophobic surface.

Example 3

On the basis of Example 1, in Example 3, the diameter of the carbon powder reached 150 nm, the thickness of the carbon powder absorption layer was 300 μm, and the energy of laser peening was set to 8 J.

Figure 5:
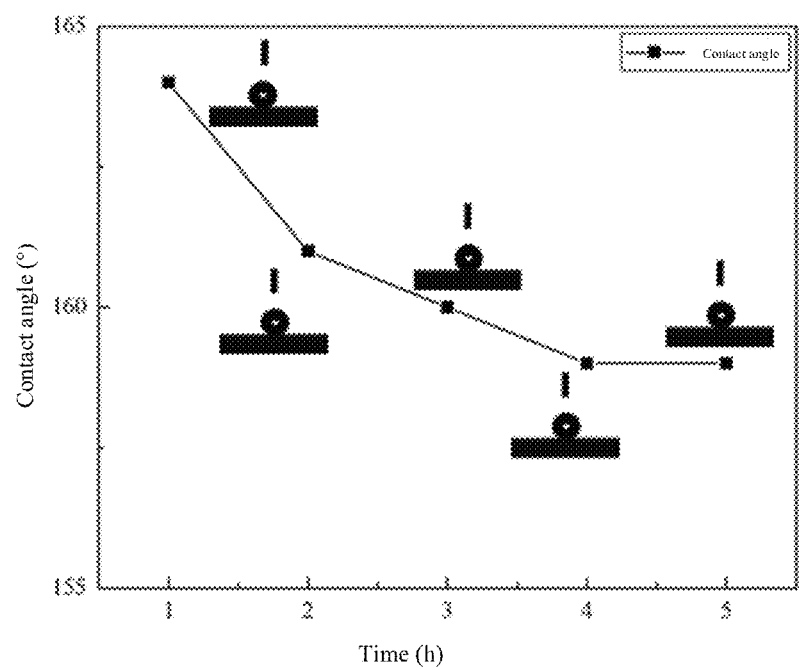
FIG. 5 is a graph showing the variation of droplet contact angles on a super-hydrophobic surface prepared in Example 3 of the present disclosure after being subjected to ultrasonic vibration treatment for different durations.

The droplet contact angle and rolling angle of the sample surface treated in Example 3 were respectively 164° and 4°. The surface of the prepared aircraft-grade aluminum alloy sample also had excellent super-hydrophobicity. The microhardness value of the super-hydrophobic aircraft-grade aluminum alloy surface prepared in this example was 201 HV, showing a 54.6% increase over the average hardness of 130 HV on the surface of the untreated sample matrix material. The sample prepared in Example 3 was placed on an ultrasonic vibration table for a stability characterization test of the hydrophobic surface. As shown in FIG. 5, as the vibration time increased, the droplet contact angle on the prepared super-hydrophobic surface decreased, but still remained at 155° or above after 5 hours, showing that the prepared super-hydrophobic aircraft-grade aluminum alloy surface has high mechanical stability.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A method for preparing a super-hydrophobic aluminum alloy surface through a flat-topped laser peening, comprising the following steps:
   pretreating an aluminum alloy surface;
   evenly coating the aluminum alloy surface with a nanoscale carbon powder layer;
   performing an peening treatment on the aluminum alloy surface using a square spot flat-topped nanosecond pulsed laser with the nanoscale carbon powder layer serving as an absorption layer, wherein beams are kept perpendicular to the aluminum alloy surface all the time; a laser irradiation on the nanoscale carbon powder layer increases an absorption rate of a laser energy; a part of the nanoscale carbon powder converts into plasmas after absorbing the laser energy; and a shock wave generated by a rapid expansion of the plasmas stirs and mixes a melted carbon powder and a remelted material of the aluminum alloy surface to increase a carbon content near the aluminum alloy surface; and removing a residual carbon nanopowder after the flat-topped laser peening, and reducing a surface energy of an aluminum alloy material through a low-temperature heat treatment to obtain the super-hydrophobic aluminum alloy surface with micro-nano multiscale structures.

2. The method for preparing the super-hydrophobic aluminum alloy surface through the flat-topped laser peening according to claim 1, wherein the pretreating comprises: grinding and polishing the aluminum alloy surface step by step to reach a surface roughness of less than or equal to 50 μm, ultrasonically cleaning the aluminum alloy surface with a deionized water, and drying, and wherein a diameter range of a carbon nanopowder is 50 nm-300 nm, and a thickness of the nanoscale carbon powder layer is 100 μm-500 μm.

3. The method for preparing the super-hydrophobic aluminum alloy surface through the flat-topped laser peening according to claim 1, wherein the nanoscale carbon powder layer is a mixture of a carbon nanopowder and an epoxy resin adhesive.

4. The method for preparing the super-hydrophobic aluminum alloy surface through the flat-topped laser peening according to claim 1, wherein the square spot flat-topped nanosecond pulsed laser is obtained by passing a circular flat-topped nanosecond pulsed laser through a beam shaper.

5. The method for preparing the super-hydrophobic aluminum alloy surface through the flat-topped laser peening according to claim 1, wherein a laser emitter generating the square spot flat-topped nanosecond pulsed laser is an Nd:YAG solid-state laser emitter, and processing parameters of the laser emitter comprise: a wavelength of 1064 nm, a laser energy of 1 J-15 J, a repetition frequency of 1 Hz-5 Hz, a pulse width of 10 ns-20 ns, and a square spot side length of less than or equal to 5 mm.

6. The method for preparing the super-hydrophobic aluminum alloy surface through the flat-topped laser peening according to claim 1, wherein a method for reducing the surface energy of the aluminum alloy material through the low-temperature heat treatment is: treating a peened aluminum alloy material in a vacuum drying oven at 80° C.-150° C. for 1 hours to 10 hours.

* * * * *